United States Patent [19]

Katsura et al.

[11] 4,233,206

[45] Nov. 11, 1980

[54] PROCESS FOR THE PRODUCTION OF COLORED POLYOLEFIN MOLDED ARTICLES AND COLORANTS USED THEREIN

[75] Inventors: Hiromitsu Katsura; Morihiko Endo; Takashi Kanno, all of Tokyo, Japan

[73] Assignee: Toyo Ink Manufacturing Co., Ltd., Tokyo, Japan

[21] Appl. No.: 629,267

[22] Filed: Nov. 6, 1975

[30] Foreign Application Priority Data

Nov. 20, 1974 [JP]    Japan ................................ 49-132715

[51] Int. Cl.$^2$ ........................... C08K 5/11; C08K 5/12
[52] U.S. Cl. ............................ 260/42.21; 106/288 Q;
260/208; 260/314.5; 260/325 PH; 260/376;
560/221; 560/255; 544/72; 546/57; 549/52;
560/105
[58] Field of Search ................. 260/314.5, 42.21, 208,
260/314.5, 376, 325 PH, 279 QA, 331; 106/288
Q; 560/105, 221, 255; 544/72; 549/52; 546/57

[56] References Cited

U.S. PATENT DOCUMENTS

| | | | |
|---|---|---|---|
| 3,764,361 | 10/1973 | Kienzle | 260/314.5 |
| 3,775,423 | 11/1973 | Lamura | 260/314.5 |
| 3,917,639 | 11/1975 | Paget et al. | 260/314.5 |
| 3,950,403 | 4/1976 | Rys et al. | 260/314.5 |
| 3,981,734 | 9/1976 | Cabut | 106/288 Q |

*Primary Examiner*—James H. Derrington
*Attorney, Agent, or Firm*—Jordan and Hamburg

[57] ABSTRACT

A process for the production of a colored polyolefin molded articles comprising adding to a polyolefin either a compound of the formula D$\vcenter{\hbox{$+$}}$CH$_2$O.OC—R])$_n$ as a colorant wherein D is the residue of a common organic pigment, R is an alkyl, alkenyl or aryl group having up to 20 carbon atoms and n is an integer of 1-4, or a mixture of the compound of the above formula with at least one usual pigment, to form a mixture, and then molding the mixture thereby producing the desired colored articles. This invention also relates to the compound of said formula and to a mixture thereof with at least one common pigment.

14 Claims, 1 Drawing Figure

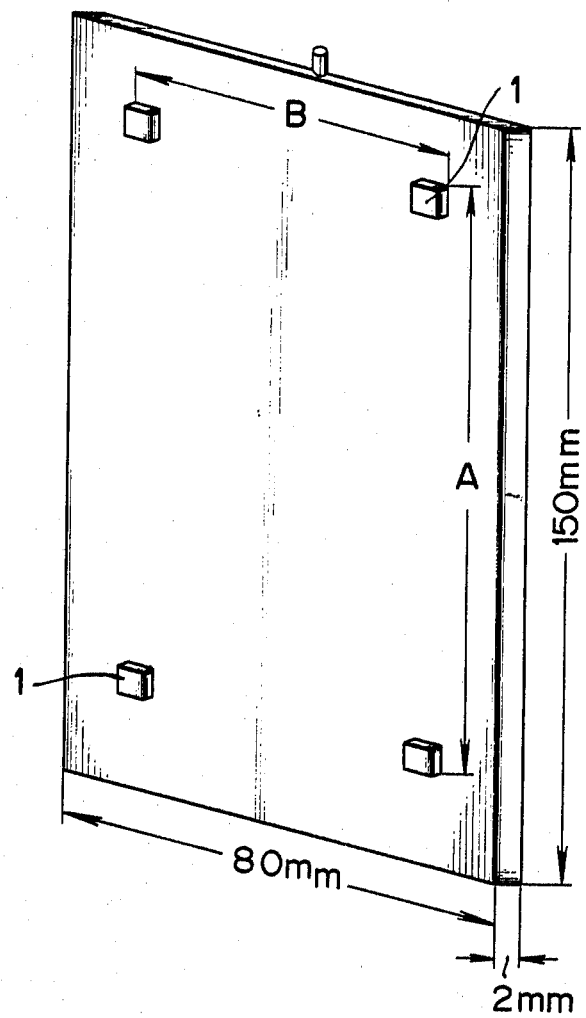

PROCESS FOR THE PRODUCTION OF COLORED POLYOLEFIN MOLDED ARTICLES AND COLORANTS USED THEREIN

This invention relates to a process for producing colored polyolefin molded articles. More particularly it relates to a process for producing colored polyolefin molded articles having improved dimensional stability.

In the production of colored polyolefin molded articles, there have heretofore been raised problems of dimensional accuracy of the colored articles, that is problems of dimensional change of the colored articles and consequent deformation thereof caused at the time of molding and with the lapse of time thereafter, the change and deformation being considered troublesome in the industrial field concerned. High-density polyethylenes prepared by the Ziegler's process, which are among polyolefins, are widely used in many fields since they are a crystalline polymer having a straight-chain molecular structure and various excellent properties. However, the high-density polyethylenes are liable to crystallize when they are molded by being charged in the molten state in a mold and, at this time, they shrink due to a change in their volume caused by a change in their phase from the molten state to the solid one whereby the resulting molded articles not only become small in finished size with respect to the mold used, but also shrink in different degrees depending on the direction in which the molten polymer flows in the mold when molded. Particularly when they are subjected to injection molding they will tend to exhibit remarkable orientation since their crystalline portion is liable to be oriented in the direction wherein they flow in the molten state in the mold. Thus such molded articles must actually be produced in due consideration of shrinkage as mentioned above.

Usually, inorganic and/or organic pigments are added as a coloring agent to polyolefins and it is known that the pigments added have a considerable effect on the dimensional accuracy of the resulting colored molded articles. Pigments have different effects on the dimensional accuracy of the colored molded articles in which they are contained. Even if added to polyolefins in any amounts, inorganic pigments will generally permit the production of colored molded articles having approximately the same dimensional accuracy as those (non-colored molded articles) in which no pigments are contained; such inorganic pigments include, for example, carbon black, titanium dioxide, zinc oxide, cadmium yellow, cadmium red, molybdate orange, chrome yellow, prussian blue, red iron oxide and ultramarine blue. On the other hand, if added to polyolefins even in small amounts, organic pigments which are hereinafter illustrated will result in the production of colored molded articles having peculiar shrinkage, that is longitudinal shrinkage (shrinkage in the direction wherein the molten resin flows at the time of molding) and lateral shrinkability (shrinkage in the direction perpendicular to said direction), the two types of shrinkage being remarkably different from each other. Such organic pigments include, for example, anthraquinone pigments such as Flavanthrone, Anthrapyrimidine Yellow, Brominated Anthanthrone and Indanthrone; polyazo pigments; isoindolinone pigments; perylene pigments; quinacridone pigments; phthalocyanine pigments such as phthalocyanine blue and phthalocyanine green.

As is seen from the above, it is admitted that, in general, inorganic pigments will have hardly any effects on the dimensional accuracy, whereas organic pigments will have great effects thereon. However, the organic pigments are differentiated from the inorganic ones in that the former are characterized by brilliant color tone, high tinting strength and the like. The organic pigments have thus been widely used in coloring plastics, but their use has been limited in coloring polyolefins or in producing colored polyolefin molded articles for the aforesaid reason.

Various studies had been made by the present inventors in an attempt to find organic pigments which when used in producing colored polyolefin molded articles will give the colored articles having excellent dimensional stability and, as a result of their studies, it has been found that there may successfully be obtained colored polyolefin molded articles having approximately the same dimensional stability as corresponding non-colored ones by using in the production of the colored polyolefin articles either an organic pigment which is capable of excellently brilliant coloration due to its satisfactory dispersibility and is represented by the following general formula (I)

$$D\text{--}[CH_2O.OC\text{--}R]_n \qquad (I)$$

wherein D is the residue of a common organic pigment, R is an alkyl, alkenyl or aryl group having up to 20 carbon atoms, whether substituted or non-substituted, and n is an integer of from 1 to 4, or a mixture of the organic pigment (I) and at least one usual pigment which may be a common inorganic and/or organic pigment.

The coloring agents or colorants according to this invention when used will very effective in solving the aforesaid problems that in the production of colored molded polyolefin articles the colored polyolefin material for the articles not only shrinks due to a change in volume caused by a change in phase from the molten state to the solid one (molded article) whereby the resulting molded article becomes small in finished size with respect to the mold used, but also shrink in different degrees depending on the direction in which the molten polymer flows in the mold when molded whereby the resulting molded article is deformed depending on its expected shape. In other words, it has been found that the use of the colorants in the production of colored molded polyolefin articles will permit colored molded articles to be produced with an excellent dimensional stability.

Furthermore, with regard to the conventional coloration of polyolefin type resins, the conventional pigments when used are not dispersed well in a polyolefin because the polyolefin is inactive due to its remarkable surface non-polarity; in order to solve these problems the metallic salts of stearic acid, etc. have generally been added and, to this end, these additives are necessary to add in large amounts thereby sometimes causing uneven coloration called "flow mark".

According to this invention, it has been found that by chemically combining the long-chain alkyl, alkenyl or aryl compound that is the effective component of the additive, with at least one common pigment as shown in said general formula [I], the compound of the formula [I] will permit the common pigment to be very satisfactorily dispersed in polyolefins even if used in smaller amounts together with the common pigment.

The residue D of an organic pigment, indicated in the general formula [I] may be that of anthraquinone type pigments such as Flavanthrone (C.I. Pigment Yellow 24), Anthrapyrimidine Yellow (C.I. Pigment 108), Brominated Anthanthrone (C.I. Pigment Red 168) and indanthrone (C.I. Pigment Blue 60); that of azo type pigments such as Cromophthal Yellow (C.I. Pigment Yellow 93, 94, 95); that of isoindolinone pigments such as Tetrachloroisoindolinone (C.I. Pigment Yellow 109, 110); that of perylene pigments such as Perylene Scarlet (C.I. Pigment Red 149), Perylene Maroon (C.I. Pigment Red 179) and Perylene Red (C.I. Pigment Red 190); that of quinacridone pigments such as Non-substituted quinacridone (C.I. Pigment Violet 19), 2,9-dimethyl-quinacridone (C.I. Pigment Red 122) and 4,11-dichloroquinacridone; that of phthalocyanine pigments such as phthalocyanine (C.I. Pigment Blue 16), metallic [copper (C.I. Pigment Blue 15), iron, cobalt, nickel or the like] phthalocyanine and chlorinated phthalocyanine; that of thioindigo pigments such as 1,4,5,8-tetrachlorothioindigo (C.I. Pigment Red 88); and that of other various organic pigments such as Dioxazine Violet (C.I. Pigment Violet 23). The common organic pigments which may be used in admixture with the compound of the general formula [I] include the above-mentioned organic pigments. In addition, the symbol "R" indicated in said formula is an alkyl, alkenyl or aryl group, whether non-substituted or substituted (as by a halogen atom, hydroxyl group or amino group).

The compounds represented by the general formula [I] may be produced by converting a common pigment to its methylol compound and esterifying the methylol compound, using known methods, as illustrated below:

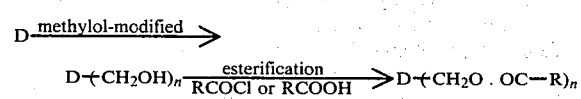

$$D \xrightarrow{\text{methylol-modified}} D \text{\textendash}(CH_2OH)_n \xrightarrow[\text{RCOCl or RCOOH}]{\text{esterification}} D \text{\textendash}(CH_2O \cdot OC \text{\textendash} R)_n$$

wherein D is a usual pigment, D— is the residue of the common pigment, and R and n are as previously defined.

Firstly, a common pigment is treated with paraformaldehyde in a strong acid such as sulphuric acid or polyphosphoric acid and then hydrolyzed with water or an aqueous solution of an alkali to form a methylol compound as an intermediate of the compound of the formula [I]; or a common pigment is treated in accordance with the procedure described in British Pat. No. 586,340 thereby to synthesize a chloromethylated compound which is then hydrolyzed to form a methylol compound. In some cases, such a methylol compound is also obtained by converting the intermediate of a common pigment to the corresponding methylol compound and synthesizing from the corresponding methylol compound.

Secondly, the methylol compound thus obtained as the intermediate of the desired compound of the formula [I] is esterified to produce the desired compound.

According to this invention, there are produced colored polyolefin molded articles having satisfactory dimensional stability by using as the colorant a compound of the formula [I] alone or a mixture thereof with a common pigment in the production of the colored polyolefin molded articles. The common pigments herein used include the aforesaid inorganic and organic pigments and the mixtures thereof which are now generally used. The colorant according to this invention may further be incorporated with not only extenders such as calcium carbonate and barium sulphate but other additives usually used in the preparation of polyolefin moldings.

A pigment of the general formula [I] synthesized from, for example, copper phthalocyanine may be used in admixture not only with phthalocyanine blue but also with a yellow pigment such as Flavanthrone Yellow, isoindolinone yellow or the like as the colorant in the preparation of colored polyolefin molded articles having dimensional stability although the color of the articles is to be from greenish yellow to green; furthermore, a red pigment of the general formula [I] prepared from, for example, quinacridone (that is, the symbol D of the formula [I] is the residue of quinacridone) may be used in admixture not only with quinacridone red but also with isoindolinone yellow, phthalocyanine blue or a mixture of inorganic and organic pigment in the preparation of colored polyolefin molded articles having the same dimensional stability as corresponding non-colored ones (containing no pigments).

As is seen from the above the use as a colorant, of the compound of the general formula [I] alone or of a mixture thereof with the usual pigments was effective in improving the resulting colored articles containing the colorant in dimensional stability, irrespective of the respective chemical structures of the colorants used.

The coloring and dimensionally stabilizing effects on polyolefins obtainable by adding a mixture of the compound of the general formula [I] with at least one common pigment as the colorant to the polyolefins greatly depends on how well the compound of the formula [I] and the common pigment are blended together; thus, if they are together blended so thoroughly as to form a uniformly and closely blended mixture, the intended coloring and dimensionally stabilizing effects will be obtained by adding the mixture in smaller amounts.

When the compound of the formula [I] is simply dry blended with the usual pigment, the former is necessary to use in amounts of at least 5% by weight, while when they are wet blended together in a paste or slurry form followed by being ground and mixed at the same time on grinding machines such as kneader or ball mill, the compound of the formula [I] may be added in remarkably decreased amounts as compared with the former case. Particularly when either a methylol compound which is an intermediate of the compound of the formula [I], together with the common pigment, is dissolved in a solvent such as sulphuric acid to form a solution which is then incorporated with a poor solvent such as water thus co-precipitating the methylol compound and the common pigment, or the methylol compound and common pigment are uniformly mixed with each other on a kneader, ball mill or the like to form a mixture in a particulate form and then the methylol groups on the particles of the mixture are esterified with an acid or acid chloride having the same alkyl group or the like as the symbol R in the general formula, the mixture of the compound of the formula [I] so formed with the common pigment may be added in further decreased amounts to obtain the same effect as above. Acids which may be used for said esterification include butyric, caproic, capric, lauric, myristic, palmitic, stearic, oleic, linoleic, linolenic, methylmyristic, benzoic and substituted benzoic acids. In the above case there is obtained the great coloring effect which is different from the coloring and dimensionally stabilizing effects obtained with the mixture prepared by simply blending the compound of the formula [I] with the common pigment since the effective component $-(-CH_2O.OC-R)_n$ of the compound of the formula [I], which is effective for the dispersion of the colorant and for the dimensional stability of the resulting colored polyolefin molded articles, is concentrated on the surface of the particles of the common pigment. It is more preferable to use the compound of the formula [I] and the common pigment, particularly organic pigment, in combination than to use the compound of the formula [I] alone in the production of colored polyolefin molded articles since the former is more satisfactory in coloring and will result in the production of colored molded articles which are more satisfactory in light resistance, solvent resistance and other resistance properties.

The colorant according to this invention, which contain at least one part by weight of the compound of the formula [I] and 100 parts by weight of at least one common pigment, may preferably be used in amounts of 0.001–15 parts by weight per 100 parts by weight of a polyolefin.

If necessary, the colorants according to this invention may be used together with additives such as a metal salt of stearic acid and a wax and more particularly they may be used in the form of a dry color prepared by simply blending the colorant with the additives, in the form of a master batch prepared by simply blending the colorant with the additives and a small amount of a polyolefin or in the form of pellets prepared by blending the colorant, additives and polyolefin together so that the pellets have the same composition as colored polyolefin molded articles being produced therefrom. The colorant and a polyolefin may be blended together on a tumbler, Henschel mixer or the like. The resulting blends may be molded by injection, extrusion, blow or like molding.

The step of esterification is illustrated in the following Preparations in which all parts are by weight.

Preparation 1

Ten parts of bismethylol copper phthalocyanine were thoroughly suspended and dispersed in 100 parts of xylene, incorporated with 12 parts of stearic chloride, heated under reflux while agitating for three hours, cooled and filtered off to obtain solid matter which was then thoroughly washed and dried thus obtaining 19 parts of stearic ester (II) of bismethylol copper phthalocyanine according to this invention.

In the same manner as above, 22 parts of trimethylol copper phthalocyanine stearic ester (III) were obtained from 10 parts of trimethylol copper phthalocyanine.

Preparation 2

Ten parts of monomethylol copper phthalocyanine were thoroughly suspended and dispersed in 100 parts of dioxane, incorporated with 3 parts of capric chloride, heated under reflux while agitating for 3 hours, cooled and filtered off to obtain a residue which was washed with methanol and dried thereby to obtain 12 parts of the corresponding monomethylol copper phthalocyanine capric ester (IV). In the same manner as above, there was obtained monomethylol copper phthalocyanine benzoic ester (V) from monomethylol copper phthalocyanine and benzoyl chloride.

Preparation 3

Ten parts of monomethylol copper phthalocyanine were suspended in 100 parts of xylene, incorporated with 3 parts of capric acid and 0.1 part of p-toluenesulfonic acid and heated under reflux for effecting the reaction for 8 hours while removing the water produced to outside the reaction system, thereby obtaining 12 parts of the same compound (IV) as in Preparation 2.

Preparation 4

Ten parts of monomethylol quinacridone were thoroughly suspended in 100 parts of dioxane, incorporated with 2.5 parts of trimethylacetyl chloride, heated under reflux while agitating for 3 hours, cooled and filtered off to collect solid matter which was washed with methanol and dried thus obtaining 12.4 parts of monomethylol quinacridone trimethylacetyl ester (VI).

In the same manner as above, there were obtained 13.5 parts of dimethylol quinacridone n-butyric ester (VII) from 10 parts of dimethylol quinacridone and 4 parts of butyric chloride.

Preparation 5

Ten parts of monomethylol Flavanthrone were thoroughly suspended in 100 parts of dioxane, incorporated with 7 parts of oleic chloride, heated to about 100° C. under agitation for 3 hours, cooled and filtered off to collect solid matter which was then washed with methanol and dried thereby to obtain 16 parts of monomethylol Flavanthrone oleic ester (VIII).

In the same manner as above, there was obtained 14 parts of bismethylol isoindolinone oleic ester (IX) from 10 parts of bismethylol isoindolinone.

Preparation 6

Ten parts of monomethylol copper phthalocyanine and 90 parts of copper monochlorophthalocyanine were dissolved in 100 parts of 98% sulphuric acid to form a solution. The solution so formed was diluted with 50 parts of 50% sulphuric acid and agitated for 3 hours to form an acid slurry which was then poured into a lot of water to decompose the sulphate. The residue thus produced was washed with water and dried to obtain 100 parts of the co-precipitate of pigments. Ten parts of the co-precipitate were dispersed in 100 parts of xylene and incorporated with one part of stearic chloride to react them with each other under reflux for 3 hours thereby obtaining 10.5 parts of a colorant (X) according to this invention.

A co-precipitate of methylol pigments may also be obtained by dissolving 10 parts of copper phthalocyanine in 100 parts of 100% sulphuric acid, incorporated with 5 parts of paraformaldehyde, heated to 105° C. under agitation for 5 hours, cooled, incorporated with 56 parts of 50% sulphuric acid to dilute the sulphuric acid to 80% in concentration, agitated for 3 hours, poured into 1000 parts of water and filtered off to collect residue which was washed with water and then dried.

Preparation 7

This Preparation illustrates that a very satisfactorily blended mixture may be obtained by blending an intermediate of the compound of the formula [I] with a usual pigment and allowing them to complete the reaction therebetween.

Twenty parts of monomethylol quinacridone, 180 parts of γ-type quinacridone were pulverized, 1 Kg of a pulverizing salt (which assists in pulverizing said pigments) and 160 parts of diethylene glycol were ground together on a one-gallon kneader for 5 hours, introduced into a diluted hydrochloric acid to form a mixture. The mixture so formed was heated to about 70° C. under agitation for one hour and filtered off to collect a residue which was washed with water, dried and pulverized thereby to obtain 100 parts of an intimately blended mixture of the monomethylol quinacridone with the γ-type quinacridone. Ten parts of the mixture so obtained were dispersed in 100 parts of toluene, incorporated with one part of stearic acid and 0.01 part of p-toluenesulfonic acid to form a mixture, allowing the mixture to react under reflux for 8 hours while removing the water produced, thus obtaining 10.8 parts of the desired colorant (XI).

For comparison with the use of the colorant according to this invention, Comparative examples 1-12 using a common pigment or pigments as the colorant are shown hereinunder.

Comparative examples 1-12

Various pigments or colorants were each blended with a high-density polyethylene (having a specific gravity of 0.970 and melt index of 6 and supplied under the trade mark "HIZEX 2208-J" by Mitsui Petrochemical Industrial Co., Ltd.) to form a mixture which was molded by an injection molding machine (supplied under the trade mark "1S80A" by Toshiba Kikai Co., Ltd.) under the conditions that the molding temperature at the nozzle was 260° C., temperatures at cylinder $C_1$, $C_2$ and $C_3$ were 230° C., 240° C. and 250° C. respectively, the mold was at 50° C. and the injection pressure was 80 Kg/cm$^2$ Gauge, thereby to obtain pigment-containing or colored polyethylene injection plates as shown in the accompanying drawing in which:

The FIGURE shows a perspective view of an injection molded plate with four protrusions, which is used in a test for shrinkage ratio.

The colored polyethylene plates so obtained were tested for shrinkage one week after they had been obtained. The results are shown in Table 1. Measurement for shrinkage ratios:

One week after the injection molded plates had been obtained by molding, they were measured for their shrinkages. The lengths 120 mm and 60 mm respectively represented by the symbols A and B in the injection molded plate in the figure were the original ones before shrinkage took place in the plate, that is, just before releasing the plate from the mold. Thus, said original lengths were substantially identical with the lengths between the recesses of the mold corresponding to said protrusions of the plate, respectively. The length A was that in the (longitudinal) direction wherein the molten resin had flowed and the length B was that in the (lateral) direction perpendicular to said longitudinal direction.

Assuming that the lengths found A and B one week after the molding are designated as LA and LB (in mm) respectively, and the shrinkage ratios for A and B as SA and SB respectively,

TABLE 1

$$SA = \frac{120 - LA}{120} \times 100 \, (\%)$$

$$SB = \frac{60 - LB}{60} \times 100 \, (\%)$$

$$\text{Shrinkage ratio} = \frac{SA}{SB}$$

| Com. ex. | Pigment or colorant | Amount of pigment added (%) | SA (%) | SB (%) | Shrinkage ratio |
|---|---|---|---|---|---|
| 1 | Non-colored polyethylene | None | 2.21 | 1.91 | 1.16 |
| 2 | Titanium dioxide | 0.4 | 2.26 | 1.87 | 1.21 |
| 3 | Cadmium yellow | 0.4 | 2.24 | 1.90 | 1.18 |
| 4 | Cadmium red | 0.4 | 2.25 | 1.91 | 1.18 |
| 5 | Phthalocyanine blue (Stable type) | 0.1 | 3.90 | 1.83 | 2.13 |
| 6 | Phthalocyanine blue (Meta-stable type) | 0.1 | 3.95 | 1.80 | 2.19 |
| 7 | Phthalocyanine green | 0.1 | 3.77 | 1.83 | 2.02 |
| 8 | Quinacridone | 0.1 | 3.70 | 1.83 | 2.06 |
| 9 | Isoindolinone yellow | 0.1 | 3.89 | 1.83 | 2.13 |
| 10 | Perylene red | 0.1 | 3.93 | 1.81 | 2.17 |
| 11 | Brominated Anthanthrone | 0.1 | 3.65 | 1.82 | 2.01 |
| 12 | Titanium dioxide + phthalocyanine blue (70:30) | 0.3 | 3.61 | 1.82 | 1.98 |

As is seen from this Table, the use of each of the inorganic pigments in the polyethylene exhibited approximately the same shrinkage ratio as the non-use of pigments therein, while the use of each of the organic pigments or a mixture of the organic and inorganic pigments exhibited the longitudinal shrinkage ratio (SA) was larger than the lateral shrinkage ratio (SB), this being unsatisfactory or defective in dimensional accuracy.

This invention will be better understood by the following Examples.

EXAMPLE 1-16

The procedure pf Comparative example 1 was followed, except that the common pigment was substituted by each of the mixtures of pigments (colorants) shown in the following Table 2-1. The results are shown in Table 2-2.

From Tables 1 and 2-2 it is seen that the use of each of the pigment mixtures (colorants) according to this invention resulted in the production of colored molded articles having excellent dimensional accuracy as compared with the use of the common organic pigment or a mixture of the organic and inorganic pigments. Thus, the pigment mixtures according to this invention were found to be highly useful as a colorant in the production of colored polyolefin molded articles.

TABLE 2-1

| Ex. | Composition of colorant used | Mixing ratio (by weight) |
|---|---|---|
| 1 | Compound (II) | |
| 2 | Compound (II) + phthalocyanine blue | 5:95 |
| 3 | Compound (III) + quinacridone red | 8:92 |
| 4 | Compound (IV) + phthalocyanine green | 10:90 |
| 5 | Compound (V) + phthalocyanine blue | 6:94 |
| 6 | Compound (VI) + quinacridone red | 5:95 |
| 7 | Compound (VI) + isoindolinone yellow | 7:93 |
| 8 | Compound (VII) | |
| 9 | Compound (VIII) + quinacridone red | 5:95 |
| 10 | Compound (VIII) | |
| 11 | Compound (VIII) + Flavanthrone yellow | 6:94 |
| 12 | Compound (VIII) + isoindolinone yellow | 10:90 |
| 13 | Compound (IX) + isoindolinone yellow | 8:92 |

TABLE 2-1-continued

| Ex. | Composition of colorant used | Mixing ratio (by weight) |
|---|---|---|
| 14 | Compound (X) | |
| 15 | Compound (XI) | |
| 16 | Compound (II) + phthalocyanine blue + titanium dioxide | 5:27:70 |

TABLE 2-2

| Example | Amount of colorant added (%) | SA (%) | SB (%) | Shrinkage ratio |
|---|---|---|---|---|
| 1 | 0.1 | 2.29 | 1.91 | 1.20 |
| 2 | 0.1 | 2.35 | 1.84 | 1.28 |
| 3 | 0.1 | 2.21 | 1.86 | 1.19 |
| 4 | 0.1 | 2.18 | 1.90 | 1.15 |
| 5 | 0.1 | 2.45 | 1.92 | 1.28 |
| 6 | 0.1 | 2.24 | 1.88 | 1.19 |
| 7 | 0.1 | 2.15 | 1.91 | 1.13 |
| 8 | 0.1 | 2.23 | 1.90 | 1.17 |
| 9 | 0.1 | 2.32 | 1.89 | 1.23 |
| 10 | 0.1 | 2.31 | 1.93 | 1.20 |
| 11 | 0.1 | 2.40 | 1.88 | 1.28 |
| 12 | 0.1 | 2.15 | 1.84 | 1.17 |
| 13 | 0.1 | 2.20 | 1.90 | 1.16 |
| 14 | 0.1 | 2.30 | 1.92 | 1.20 |
| 15 | 0.1 | 2.29 | 1.90 | 1.20 |
| 16 | 0.3 | 2.28 | 1.89 | 1.21 |

EXAMPLES 17–24 and Comparative examples 13–17

The procedure of Comparative example 1 was followed, except that the resin (polyethylene) was substituted by polypropylene (having a melt index of 0.9 and supplied under the trade mark "Noblen BC-8" by Mitsubishi Yuka Co., Ltd.) and the colorants shown in Table 3 were each used. The results are indicated in Table 3.

TABLE 3

| Comparative example | Colorant | Amount of colorant added (%) | SA (%) | SB (%) | Shrinkage ratio |
|---|---|---|---|---|---|
| 13 | Non-colored polypropylene | — | 1.75 | 1.67 | 1.05 |
| 14 | Cadmium red | 0.4 | 1.77 | 1.63 | 1.09 |
| 15 | Titanium dioxide | 0.4 | 1.76 | 1.65 | 1.07 |
| 16 | Phthalocyanine blue | 0.1 | 1.98 | 1.58 | 1.25 |
| 17 | Quinacridone red | 0.1 | 2.01 | 1.61 | 1.25 |
| Example | | | | | |
| 17 | Compound (II) + pthalocyanine blue | 0.1 | 1.80 | 1.66 | 1.08 |
| 18 | Compound (III) | 0.1 | 1.82 | 1.63 | 1.12 |
| 19 | Compound (III) + phthalocyanine green | 0.1 | 1.82 | 1.58 | 1.15 |
| 20 | Compound (VI) + quinacridone red | 0.1 | 1.84 | 1.67 | 1.10 |
| 21 | Compound (VIII) + isoindolinone yellow | 0.1 | 1.79 | 1.62 | 1.10 |
| 22 | Compound (IX) + isoindolinone yellow | 0.1 | 1.80 | 1.60 | 1.10 |
| 23 | Compound (X) | 0.1 | 1.81 | 1.65 | 1.10 |
| 24 | Compound (XI) | 0.1 | 1.83 | 1.62 | 1.13 |

Note:
The mixing ratios in Examples 17–24 (except Example 19) were the same as those in the corresponding Examples in Table 2-1, respectively. The mixing ratio in Example 19 was 5:95.

From this Table it is seen that the shrinkage ratio for polypropylene was not so much influenced by the colorant (pigment or a mixture of pigments) as that for polyethylene, and that the use of the compound of the formula [I] alone or the use of a colorant prepared by adding the compound of the formula [I] to the common organic and/or inorganic pigment improved the resulting colored molded articles in dimensional accuracy as compared with the use of the common organic pigment only.

What is claimed is:

1. A process for the production of a colored polyolefin molded article comprising adding at least one pigment to a polyolefin to form a mixture and molding the mixture in a mold to produce the colored polyolefin molded article, characterized by the fact that said pigment comprises a compound represented by the following general formula [I]

$$D+CH_2O.OC-R]_n \qquad [I]$$

wherein D is the residue of an organic pigment, R is a substituted or non-substituted alkyl, alkenyl or aryl group having up to 20 carbon atoms, and n is an integer of from 1 to 4.

2. A process according to claim 1, characterized by the fact that said pigment further comprises a common organic pigment and/or inorganic pigment.

3. A process according to claim 1, wherein the polyolefin is a member selected from the group consisting of polyethylenes and polypropylenes.

4. A process according to claim 2, wherein the polyolefin is a member selected from the group consisting of polyethylenes and polypropylenes.

5. A process according to claim 1, wherein D is a member selected from the group consisting of the residues of anthraquinone, polyazo, isoindolinone, perylene, quinacridone and phthalocyanine pigments.

6. A process according to claim 2, wherein D is a member selected from the group consisting of the residues of anthraquinone, polyazo, isoindolinone, perylene, quinacridone and phthalocyanine pigments.

7. A process according to claim 1, wherein R of the general formula is a substituted or non-substituted alkyl, alkenyl or aryl group having 4 to 20 carbon atoms.

8. A process according to claim 2, wherein R of the general formula is a substituted or non-substituted alkyl, alkenyl or aryl group having 4 to 20 carbon atoms.

9. A process according to claim 2, wherein the common organic pigment is a member selected from the group consisting of anthraquinone, polyazo, isoindolinone, perylene, quinacridone and phthalocyanine pigments, and the common inorganic pigment is a member selected from the group consisting of zinc oxide, titanium dioxide, chrome yellow, cadmium yellow, red iron oxide, molybdate orange, prussian blue, ultramarine blue and carbon black.

10. A process according to claim 2, wherein said at least one pigment is added to the polyolefin in amounts of 0.001–15 parts by weight per 100 parts by weight of the polyolefin.

11. A process according to claim 2, wherein said pigment comprises at least one part by weight of the compound of the general formula [I] per 100 parts by weight of the common pigment.

12. A process according to claim 1, wherein the compound of the general formula [I] is prepared by treating the organic pigment with paraformaldehyde in a strong acid to form a methylol compound represented by the formula D$\mathrm{+CH_2OH)}_n$ wherein D is the residue of the organic pigment and n is an integer of 1–4, and esterifying the thus-formed methylol compound with an acid of the formula RCOOH wherein R is a substituted or non-substituted alkyl, alkenyl or aryl group having up to 20 carbon atoms or with an acid chloride of the formula RCOCl wherein R is as defined above, thereby obtaining the compound of the general formula [I].

13. A process according to claim 12, wherein the acid is a member selected from the group consisting of butyric, caproic, capric, lauric, myristic, palmitic, stearic, oleic, linoleic, linoleinic, methylmyristic, benzoic and substituted benzoic acids.

14. A dimensionally stable, colored polyolefin molding composition comprising 100 parts by weight of a polyolefin and 0.001–15 parts by weight of a pigment represented by the following general formula (I)

$$\mathrm{D+CH_2O.OC-R)}_n \qquad (I)$$

wherein D is the residue of a phthalocyanine pigment, R is a substituted or non-substituted alkyl, alkenyl or aryl group having up to 20 carbon atoms, and n is an integer of from 1 to 4.

* * * * *